Patented July 2, 1929.

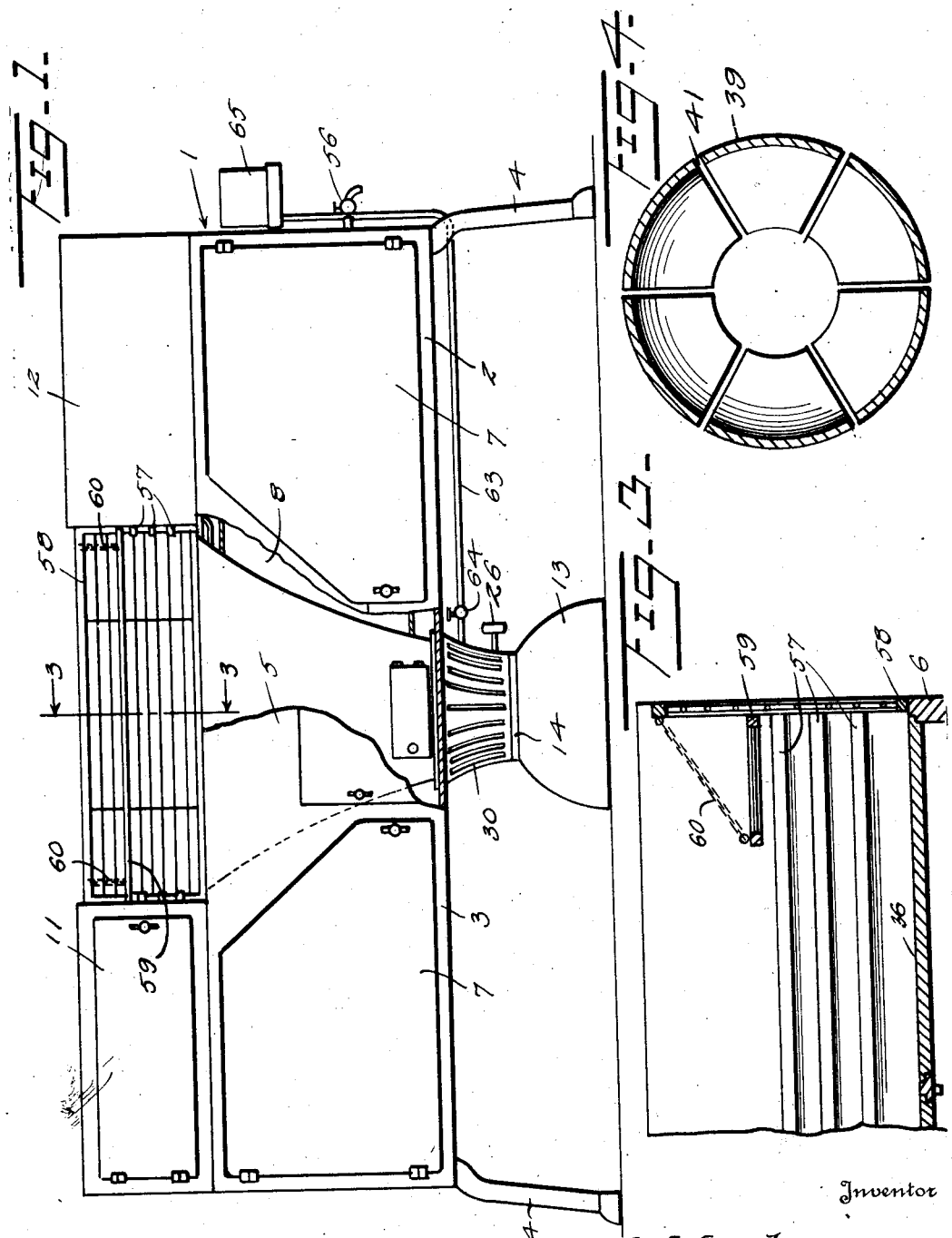

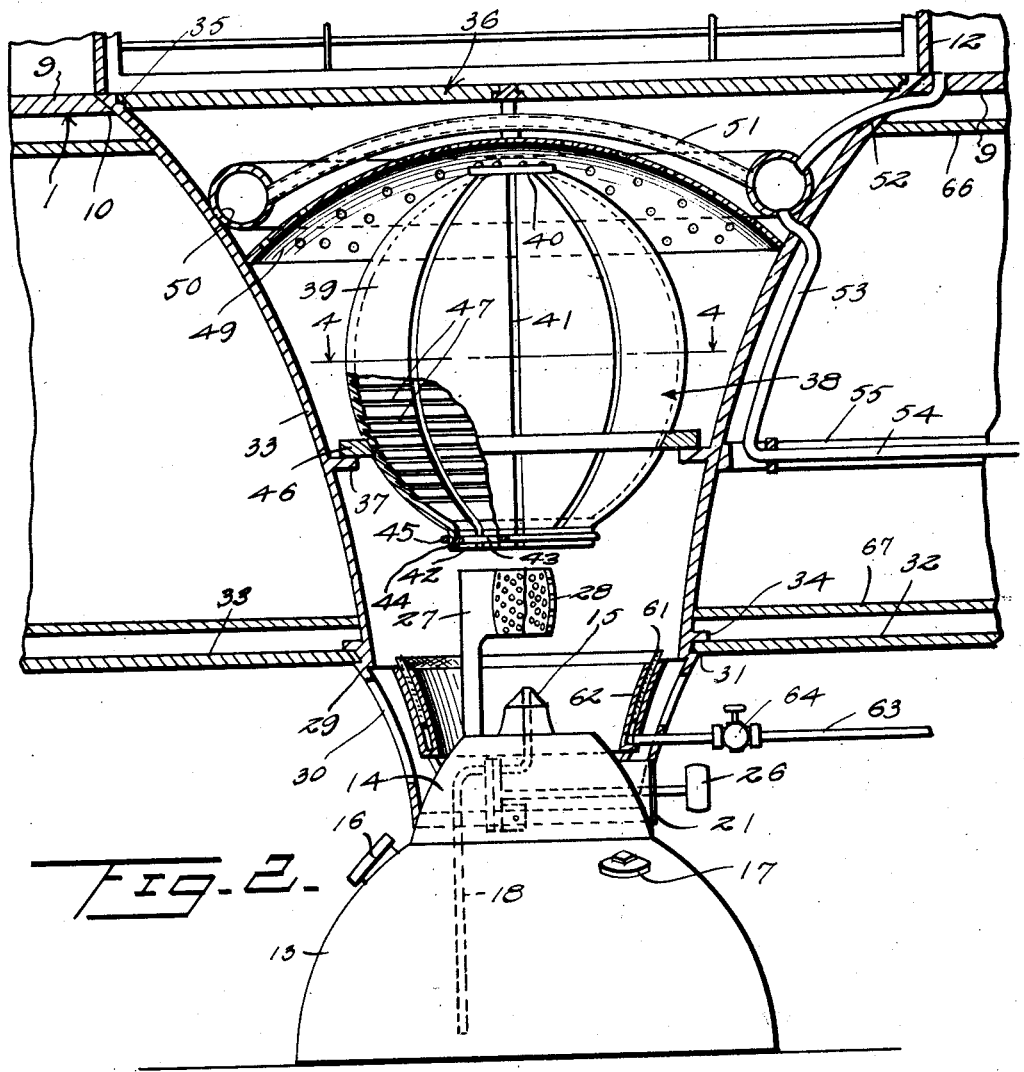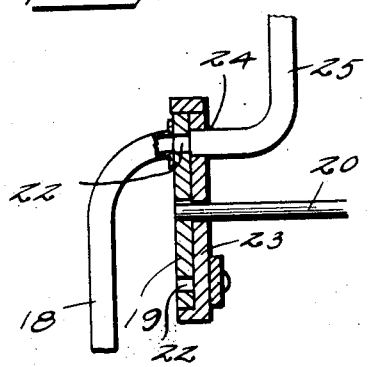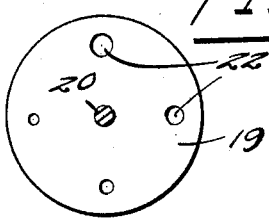

1,719,717

UNITED STATES PATENT OFFICE.

ROBERT LEE MONTGOMERY, OF IRONDALE, MISSOURI.

COOKING STOVE.

Application filed August 11, 1928. Serial No. 299,034.

This invention relates to the class of cooking stoves and aims particularly to provide an improved type of cooking stove having a plurality of ovens advantageously positioned about the source of heat.

One of the primary objects of this invention is to provide a cooking stove having a hot water heated oven by means of which an evenly regulated heat can be obtained for baking and like purposes.

Another object of the invention is to provide an improved pressure burner structure by means of which a maximum of heating energy may be obtained from the fuel employed.

A still further object of the invention is to provide a liquid fuel operated cooking stove of strong and durable and simplified construction, designed to give a maximum of efficiency and inexpensive to manufacture and set up.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 shows a stove structure embodying the present invention, in front elevation, a portion thereof being broken away to show the heating unit therein;

Figure 2 is a central longitudinal section through the heating unit showing the interior detail construction of the same;

Figure 3 is a detail sectional view taken upon the line 3—3 of Figure 1;

Figure 4 is a sectional view taken upon the line 4—4 of Figure 2;

Figure 5 is a detail sectional view of a fuel control valve;

Figure 6 is a face view of a movable member of the valve.

In the drawings, the numeral 1 indicates generally the stove structure embodying the present invention which comprises a pair of ovens 2 and 3 supported upon suitable legs 4 and connected by the front and rear walls 5 and 6 respectively. Each of the ovens is provided with a door 7 by means of which access is had to the interior thereof. A chamber 8 is formed between the ovens 2 and 3 in which a portion of the stove heating unit, hereinafter described, is positioned.

The tops 9 of the ovens 2 and 3 are connected over the chamber 8 forming a top in which there is formed a circular opening 10. At one side of the opening 10, over one of the ovens, there is positioned a supplemental oven 11 while at the opposite side over the other oven, as for example over the oven 2, there is positioned or mounted upon the top of this oven a water tank 12 which supplies water to the heating system of the underlying oven, as will be hereinafter described.

The heating unit for the present stove structure is designed to be operated by gasoline and comprises a tank 13 having the head portion 14 which is provided with a nozzle structure 15. The tank 13 is also provided with the valve opening 16 and an air inlet valve 17 to which an air pressure pump may be attached to force air into the tank so that the contents thereof may be pressure fed to the nozzle.

A fuel supply line 18 that leads from the interior of the tank 13 to one face of a disk member 19 is rotatably mounted in the head 14 in the manner shown in Figure 2. The disk 19 is carried upon the inner end of the control shaft 20 which extends through the head and projects through the wall thereof and carries upon its outer end an indicator disk 21 on which suitable indicia is formed for coaction with an indicated point upon the head for determination of the proper positioning of the valve disk 19 when the same is manipulated to admit or cut off fuel to the nozzle 15. The disk 19 is provided with a series of apertures 22 which are of graduated size and these apertures coincide at different positions of the disk with an aperture formed through an adjacent fixed disk 23, the aperture in the fixed disk being indicated by the numeral 24.

A supply pipe 25 leads from the aperture 24 in the fixed disk to the burner nozzle 15 of the heater unit. The outer end of the control shaft 20 is formed to receive the shaft of a key 26 by means of which the valve is controlled, the removal of the key making the stove safe in that unauthorized persons cannot tamper with the fuel feed line.

The head 14 of the tank carries a standard 27 which in turn supports an apertured cone or basket 28 over the nozzle wherein the fuel issuing from the nozzle mixes and burns with air in the atmosphere giving a burner of the blow torch type.

Mounted upon the head 14 is a collar 29 which is provided with the surrounding vertical slits 30 by means of which air is permitted to reach the interior of the unit. This collar 29 opens upwardly through an opening 31 in the joined floor sections 32 of the two ovens 2 and 3, the top edges thereof contacting with the under face of the oven floors at the edge of the opening.

Extending from the opening 31 upwardly to the opening 10, between the ovens 2 and 3, is a chimney 33 of inverted bell-shaped configuration. The lower end of this chimney is provided with the annular flange 34 which rests upon the bottoms 32 of the ovens when the said end is extended through the opening 31 in the manner shown in Figure 2. The upper edge of the chimney extends through the opening 10 and bears against the edge thereof as is also shown in this figure and the inner wall of the chimney at the top is provided with the annular ledge 35 upon which rests the circular head plate 36. This plate is preferably made up of a plurality of individual sections anyone of which may be removed so that more intense heat can be had.

Within the chimney 33 adjacent the lower end thereof there is formed about the wall the annular flange 37 for the support of a fire ball which is indicated as a whole by the numeral 38. This fire ball 38 is made up of a series of vertically arranged arcuate sections 39 which are secured together at one end by suitable bolt members passing through the plate 40. This end of the ball which is of somewhat oval-shape is arranged uppermost when the same is in position within the chimney. The sections 39 of the fire ball are maintained in such relation as to form openings or slits 41 therebetween.

The adjacent other ends of the sections 39 are provided with the depending flanges 42 and these ends are maintained in spaced relation by the spreader ring 43 which is slipped into the ball and positioned in the groove 44 which is formed across the inner face of each of these sections. An associate ring 45 engages over the depending flanges 42 of the ball sections and limits the spreading action of the ring 44 thereon.

Surrounding the fire ball at a point adjacent the open end thereof is an annular body 46 which is designed to rest upon the flange 37 of the chimney to maintain the ball in upright position therein with the open lower end directly over the cone 28. In this manner the flames of the burning fuel issuing from the cone will pass directly into the fire ball and leave the same through the longitudinal slits 41 thereof.

The inner faces of the sections 39 of the fire ball are provided with transverse upwardly extending slots 47 which provide additional heating surface for the unit.

Within the upper portion of the chimney 33 there is positioned the apertured dome 49, the convex face thereof being directed downwardly as shown.

Surrounding and overlying the dome 49 is an annular water heating pipe 50 which has the transverse pipe 51 extending diametrically thereacross and over the top of the dome 49. The annular pipe 50 is connected by the supply pipe 52 with the lower portion of the water tank 12 and also has a pipe line 53 leading therefrom to a feed pipe coil 54 positioned in and extending across the lower part of the oven 2. This coil 54 may be supported in any suitable manner as, for example, upon a flat frame 55 or the like.

A suitable pipe connection is made with the coil 54 and led to the exterior of the oven 2 where a draw-off faucet 56 is connected thereto so that the water within the coil may be readily withdrawn.

The opposing walls of the oven and water tank 11 and 12 are provided with the horizontal bars 57 which provide supporting tracks for a grid structure 58 when it is desired to position food above and in spaced relation to the top 36 of the heater unit. The grid 58 is shown in Figures 1 and 3 as in upright position at the back of the stove structure connecting between the oven 11 and tank 12 and it is provided, for use when in this position, with a frame 59 suitably connected at its outer edges by the chain 60 with the top edge of the grid to maintain this frame in the horizontal position shown in Figure 3.

As an auxiliary to the gasoline burner, there is provided a coal oil wick 61 which is mounted in suitable annular receptacles 62 supported upon the head 14 of the gasoline tank and surrounding the gasoline nozzle 15 in the manner shown in Figure 2.

This oil receptacle is supplied with oil by the pipe line 63 in which a control valve 64 is placed, the pipe leading from a suitable oil receptacle 65 which is arranged at a suitable point in a higher plane than the wick so that a steady flow of oil to the wick will result when the valve 64 is opened.

From the foregoing description it will be readily understood that when the gasoline within the tank 13 is lighted the flames will enter the fire ball 38 and pass therefrom through the slits 41 to the under side of the perforated bottom 49, heating the walls of the chimney 33 and the plate 36 which forms the top for the chimney. At the same time water within the pipe 50 will be heated and will circulate through the coil 54 in the oven 2, returning by a suitable return pipe line to the tank 12 from whence it came. The oven 2 heated by the boiling water within the coil 54 may be used for baking purposes while the ovens 3 and 11 at the opposite side of the stove may be used for warming purposes, these ovens getting their warmth from the heated chimney, particularly the oven 3.

As shown in Figure 2, the ovens are double walled, the inner top and bottom walls being indicated by the numerals 66 and 67 respectively. The outer walls are also provided with an adjacent inner wall structure similar to the inner walls at the top and bottom of the ovens. These inner walls of the ovens serve to distribute the heat more evenly about the ovens, the heat being carried to the outermost parts thereof in the space formed between the said inner and outer walls.

Suitable means may be employed for allowing the heat to enter the space between the inner and outer walls from the wall of the chimney 33 as for example by providing the adjacent edges of the inner walls of the oven with apertures so that the heat from the chimney may readily enter between the walls.

Any suitable means may be employed for supporting the rear edge of the frame 59 when the same is arranged in horizontal position as shown in Figure 3, as for example a cross bar may form a part of the grid 58 upon which the rear edge of the frame 59 may rest. It will be readily seen that the frame 59 as well as the grid 58 may be slidably mounted over the stove top 36 upon the strips 57.

Having described my invention, what I claim is:—

1. In combination in a cooking stove, a pair of ovens, a supplemental oven mounted above one of the ovens of said pair, a liquid tank mounted above the other of said ovens, a heating unit arranged between said pair of ovens, a water coil arranged to be heated by said unit and receiving water from said tank, and a heating coil within one of said ovens and connected to said water coil to receive hot water therefrom, said supplemental oven and liquid tank being arranged in spaced relation at opposite sides of said heating unit and a cooking plate overlying and heated by said unit and arranged between the supplemental oven and the tank.

2. In a cooking stove, a heating unit comprising a fuel container, a burner, an inverted substantially bell-shaped chimney, a heating member within the chimney comprising a sectional ball having an opening formed therein and mounted over said burner with the opening directed downwardly, an apertured flame spreader overlying said ball, and a cooking plate closing the upper end of said chimney.

3. In a cooking stove, a pair of ovens arranged in spaced relation, a top wall and a bottom wall, common to the ovens, a heating unit comprising a fuel receptacle designed to be positioned beneath an opening in the bottom wall between the ovens, a burner directed upwardly from the fuel receptacle through said opening, a chimney of inverted substantially bell-shaped design and arranged between the top and bottom walls and having the lower portion overlying the opening in the botom wall and the upper portion opening through the top wall, a cooking plate overlying the top of said chimney, a fire ball mounted within the chimney over said burner, and an apertured flame spreader plate arranged between said fire ball and the cooking plate.

4. In a cooking stove, a pair of ovens arranged in spaced relation, a top wall and a bottom wall, common to the ovens, a heating unit comprising a fuel receptacle designed to be positioned beneath an opening in the bottom wall between the ovens, a burner directed upwardly from the fuel receptacle through said opening, a chimney of inverted substantially bell-shaped design and arranged between the top and bottom walls and having the lower portion surrounding the opening in the bottom wall and the upper portion opening through the top wall, a cooking plate overlying the top of said chimney, a fire ball mounted within the chimney over said burner, an apertured flame spreader plate arranged between said fire ball and the cooking plate, a water heating coil overlying said flame spreader plate, means for supplying water to the coil, and a hot water coil arranged in one of said ovens and having connection with said heating coil to receive hot water therefrom.

5. In a cooking stove, a heating unit comprising a fuel container, a burner, an inverted substantially bell-shaped chimney overlying said burner, a fire ball arranged within said chimney and comprising a bell-shaped body made up of a plurality of complemental members of generally arcuate formation and maintained in slightly spaced relation, said ball having the lowermost portion open to permit the flame from the burner to enter therein, a domed apertured spreader plate partitioning the upper portion of the chimney and overlying the fire ball, and a cooking plate closing the top of the chimney.

6. In combination in a stove structure, a pair of ovens arranged in spaced relation, a heating unit including an inverted substantially bell-shaped chimney extending upwardly between said ovens, a cooking plate overlying the top of said chimney and in substantially the same plane as the tops of the ovens, a water heating coil arranged in the upper part of said chimney, a hot water circulating coil connected with said water heating coil and arranged in one of said ovens, an auxiliary oven overlying one of said first-mentioned ovens at one side of the cooking plate, a water tank overlying the other of the first-mentioned ovens and lying at the opposite side of the heating plate, means for supplying water to the heating coil from the tank, means for removably arranging a cooking grid between the opposed walls of the auxiliary oven and the water tank and over the cooking plate, and a grid structure normally movably mounted between the said walls at the rear of the cooking plate and designed to be mounted on said grid supporting means.

7. In a cooking stove, a fuel container, a burner, a chimney associated with the burner, a heating member comprising a hollow ball having an opening directed downwardly over the burner and provided with heat escape openings, and a cooking plate at the upper end of said chimney overlying said ball.

8. In a cooking stove, a fuel container, a burner, a chimney associated with the burner, a heating member comprising a hollow ball removably mounted in the chimney and having an opening directed downwardly over the burner and further having heat escape openings therethrough, an apertured heat diffusing plate closing said chimney over the heating member, and a cooking plate closing the upper end of the chimney over and in spaced relation to the first mentioned plate.

9. In a cooking stove, a fuel container, a burner, a chimney overlying and extending upwardly from said burner and having an enlarged upper portion, a heating member within the chimney, comprising a sectional hollow globe-like member having an opening overlying the burner, an apertured dome-shaped heat diffusing plate overlying the heating member, a cooking plate overlying the heat diffusing member, and a water heating coil arranged over and about the periphery of the heat diffusing plate.

In testimony whereof I hereunto affix my signature.

ROBT. LEE MONTGOMERY.